(12) United States Patent
Burkhart et al.

(10) Patent No.: US 7,613,559 B2
(45) Date of Patent: Nov. 3, 2009

(54) METHOD FOR AUTOMATICALLY ACTUATING LONGITUDINAL BLOCKS IN FOUR WHEEL DRIVE VEHICLES, IN PARTICULAR IN WORKING MACHINES AND SERVICE VEHICLES

(75) Inventors: Hugo Burkhart, Ravensburg (DE); Bernd Aumann, Amtzell (DE)

(73) Assignee: ZF Friedrichshafen AG, Friedrichshafen (DE)

(*) Notice: Subject to any disclaimer, the term of this patent is extended or adjusted under 35 U.S.C. 154(b) by 189 days.

(21) Appl. No.: 11/632,266

(22) PCT Filed: Jun. 16, 2005

(86) PCT No.: PCT/EP2005/006443
§ 371 (c)(1),
(2), (4) Date: Jan. 11, 2007

(87) PCT Pub. No.: WO2006/012943
PCT Pub. Date: Feb. 9, 2006

(65) Prior Publication Data
US 2007/0233350 A1    Oct. 4, 2007

(30) Foreign Application Priority Data
Jul. 30, 2004    (DE) .................. 10 2004 037 196

(51) Int. Cl.
*B60K 23/08* (2006.01)
(52) U.S. Cl. .................. 701/88; 701/69; 701/89; 180/248; 180/249
(58) Field of Classification Search .......... 701/82, 701/83, 84, 85, 86, 87, 88, 90, 91, 92, 50; 180/197, 233, 248, 249, 250
See application file for complete search history.

(56) References Cited

U.S. PATENT DOCUMENTS

| 4,751,856 | A | * | 6/1988 | Nakamura et al. ............ 477/35 |
| 5,373,912 | A | | 12/1994 | Haiki et al. |
| 6,009,969 | A | | 1/2000 | Salcher et al. |
| 6,085,138 | A | * | 7/2000 | Smith et al. .................. 701/51 |
| 6,145,614 | A | | 11/2000 | Kimura et al. |
| 6,560,549 | B2 | * | 5/2003 | Fonkalsrud et al. ........... 702/41 |
| 6,901,815 | B2 | * | 6/2005 | Torre ...................... 73/862.29 |
| 2004/0059491 | A1 | * | 3/2004 | Yoneda et al. ................ 701/69 |

FOREIGN PATENT DOCUMENTS

| DE | 196 41 101 A1 | 4/1998 |
| DE | 197 48 086 A1 | 5/1998 |
| DE | 197 49 919 A1 | 6/1998 |
| EP | 0 410 441 A2 | 1/1991 |
| EP | 0 424 932 A1 | 5/1991 |
| EP | 1 253 040 A2 | 10/2002 |
| WO | WO-99/32805 | 7/1999 |

OTHER PUBLICATIONS

Dallas Semiconductor, "Dual Audio Taper Potentiometer with Pushbutton Control," DS1902 datasheet, May 2001.*

* cited by examiner

*Primary Examiner*—Thomas G Black
*Assistant Examiner*—Peter D Nolan
(74) *Attorney, Agent, or Firm*—Davis & Bujold, P.L.L.C.

(57) ABSTRACT

A method for automatically actuating longitudinal blocks in four-wheel vehicles, particularly in working machines and service vehicles. The longitudinal blocks are always open when driving situations occur in which the blocking effect is absolutely unnecessary. The longitudinal blocks are closed in all other situations.

6 Claims, No Drawings

METHOD FOR AUTOMATICALLY ACTUATING LONGITUDINAL BLOCKS IN FOUR WHEEL DRIVE VEHICLES, IN PARTICULAR IN WORKING MACHINES AND SERVICE VEHICLES

This application is a national stage completion of PCT/EP2005/006443 filed Jun. 16, 2005, which claims priority from German Application Serial No. 10 2004 037 196.2 filed Jul. 30, 2004.

FIELD OF THE INVENTION

The invention relates to a method for automatically actuating longitudinal blocks in four-wheel drive vehicles, in particular in working machines and service vehicles.

BACKGROUND OF THE INVENTION

Conventional construction machines with articulated steering, such as articulated dumpers or suspension-joint farm tractors, construction or special machines, are equipped with powershift transmissions comprising torque converters or fluid clutches. In articulated dumpers and farm tractors, an intermediate axle differential is usually inserted in the transmission output which, unblocked, allows a torque distribution between front and rear axles and blocked implements a direct through drive. In addition, a transverse differential is mounted in each axle of the vehicle.

Differentials of four-wheel vehicles are activated, via blocking clutches (differential blocks). The blocking clutches are automatically or manually engaged to block the differential according to driving parameters of the vehicle or disengaged to open or switch off the differential block.

The engagement of power shiftable differential blocks, which can be designed, for example, as hydraulically actuated multi-disc clutches, can be automated by slip controls, that is, by comparing the rotational speeds of the wheels.

DE 197 49 919 A1 has disclosed such a method. Here within the scope of a slip control, the rotational speeds of both output shafts of the differential are compared with each other. The comparison slip signals which, as soon as they exceed a threshold value, activate the engagement of the blocking clutch of the respective differential taking into account the steering angle. Another method within the framework of which the rotational speeds of the wheels are determined is the object of DE 197 48 086 A1.

The measuring of the rotational speed on the wheels in working machines and service vehicles is expensive due to the low rotational speeds that appear, and is potentially unreliable on account of the exposed position and of the hard conditions of use.

For switching off the differential block, that is, for disengaging the blocking clutch, it is known from EP 0 424 932 B1 to utilize the ratio of the torques appearing on two transmission shafts as a characteristic value and to compare the currently determined actual characteristic value with a torque ratio determined by the transmission ratio as nominal characteristic value. Based on the comparison, another setting device is used for changing the torque load of the input and/or output train, according to the deviation. With the setting device are met the shifting conditions required for loosening the blocking clutch so that after reaching the shifting condition, the blocking clutch is disengaged and the differential block is thus opened or switched off.

From EP 0 410 441 A2 is known a differential transmission for motor vehicles where a differential block can be engaged and disengaged according to driving parameters. For shifting the differential block, operation data of the motor vehicle, especially rotational speeds of at least two drive shafts, are supplied to a control unit. As mentioned above, to make the disengagement of the differential blocks possible without repeatedly having to loosen the relevant blocking clutch for measuring rotational speed differences, it is proposed to place sensors for permanent torque detection on the shafts. In a control unit state, parameters are fed, especially one coordinated with the position of the gas lever and one torque value coordinated with the selected transmission gear of the vehicle; the same as also the ratio of two torques for disengaging the differential block. By comparing the supplied values with the actual values, it is possible better to adapt the engagement and disengagement of the differential block to the current driving conditions of the vehicle.

According to the prior art, the implementation of the methods for automatic actuation of differential blocks, on account of the required sensor system, has provided disadvantageous also as technically expensive and costly, especially for use in working machines and service vehicles. Furthermore, the use of self-blocking differentials acts negatively upon the consumption of fuel.

This invention is based on the problem of outlining a method for automatic actuation of longitudinal blocks in four-wheel vehicles, particularly working machines and service vehicles, which method needs for applying its already existing parameters and does not unfavorably affect the driving state of the vehicle precisely in critical situations. In addition, the inventive method needs no added sensor system.

DETAILED DESCRIPTION OF THE INVENTION

Accordingly, it is proposed to deduce the engagement and disengagement of the longitudinal blocks from the driving and load conditions of the vehicle using the vehicle speed and the transmission output torque as parameters.

It is provided, according to the invention, that the longitudinal blocks are engaged when the vehicle speed has fallen below a preset threshold value $v\_1$ and the transmission output torque exceeds a preset threshold value $T\_Ab1$.

It is further provided that the activated longitudinal blocks are opened when another preset threshold value $v\_2$ has been exceeded or when another threshold value $T\_Ab2$ for the transmission output torque has fallen below; $v\_2$ being higher than $v\_1$ and $T\_Ab2$ lower than $T\_Ab1$.

The idea underlying the inventive method is that the conditions suffice to detect a blocking requirement in the working application and that the longitudinal blocks are activated only in driving situations where the driving behavior of the vehicle is not noticeably impaired. When the transmission output torque is, of course, high and the vehicle speed is low, the probability of one wheel skidding is great. When the transmission output torque is low or when the vehicle speed is high, the danger of one wheel skidding is slight. The inventive opening of the blocks at high speeds prevents additional situations critical to driving.

The inventive draft ensures that the longitudinal blocks always remain open when driving situations occur in which the blocking action certainly does not become necessary. The longitudinal blocks are closed in all other situations. In this manner, the sensor system required in the prior art for detecting the need of a block is eliminated.

The value of the transmission output torque needed as parameter can be advantageously determined via the activated gear and the differential rotational speed of the hydrodynamic converter.

In order to ensure that the longitudinal blocks are not activated in driving situations where the failure of the differential effect acts negatively upon the driving behavior, the threshold value of the transmission output torque T_Ab1 can be adjusted accordingly high.

Within the scope of a specially advantageous alternative of the inventive method, it is proposed that the threshold value of the transmission output torque T_Ab1 is adjustable by the driver, via an adequate device, such as a rotation potentiometer in the dashboard, according to the conditions of utilization of the vehicle. Thereby the threshold value T_Ab1 for the transmission output torque can be adapted in according with the application, with the weather, with the road nature, etc. In this manner, the driver can adjust the threshold value in case of greasy or very uneven soil so that the longitudinal blocks are closed during a low torque. In case of ground having good grip, the longitudinal blocks can be closed by adequate adjustment only under high torque. Since the parameters generally change only rarely during a typical application, manual engagements are not or only rarely necessary.

It is provided, according to the invention, that a change of value of the threshold of the transmission output torque T_Ab1 also results in a change of threshold value of the transmission output torque T_Ab2. This can result, for example, via an algorithm or a characteristic line stored in the control.

For the case that a potentiometer is used for adjusting the threshold value T_Ab1, for example, the following functionalities are implemented according to the plotted curve of the potentiometer:

end stop 1: longitudinal blocks are never closed;
end stop 2: longitudinal blocks are manually engaged; and
area between end stop 1 and stop 2: continuous adjustment of the threshold value T_Ab1.

By virtue of this development, other engagements of the driver are not necessary so that the foot switch, usually provided in the vehicle for manual block engagement, can be eliminated. Advantageously, no added sensors are needed for applying the method since, as the rotational speed sensor is used, the sensor already existing in the transmission output. Moreover, in the control of the longitudinal blocks in an articulated dumper, the steering angle sensor of the prior art is eliminated.

It also can be provided, according to the invention, that the threshold value for the vehicle speed v_1 is adjustable by the driver.

The inventive method is especially adequate for quick working machines and service vehicles, such as dumpers, which are mainly used for transportation.

Based on the knowledge that an engagement of the longitudinal block is enough in 80% of the application cases required and in only 20% of the application cases required, it is proposed for quick vehicles, which comprise transverse blocks and longitudinal block(s) to activate the longitudinal blocks according to the inventive method and shiftably to design the transverse blocks via a button, for example, but the transverse block can also be automatedly designed.

The invention claimed is:

1. A method for controlling a central differential distributing the torque from an engine and transmission to front and rear wheels sets of a four wheel drive vehicle, the method comprising the steps of:
   determining only a vehicle speed and the transmission output torque wherein
      the transmission output torque is determined from only a current transmission gear ratio and a rotational speed differential across a hydraulic converter connected between the engine and the transmission, and
   when the vehicle speed is above a first speed threshold value and the transmission output torque is below a first torque threshold value,
      disengaging a longitudinal block, thereby allowing the transmission output torque to be differentially distributed between the front and the rear wheel sets, and
   when at least one of when the vehicle speed is below a second speed threshold value and the transmission output torque is above a second torque threshold value,
      engaging the longitudinal block, thereby allowing the front and the rear wheel sets to be directly driven by the transmission output torque.

2. The method according to claim 1,
   wherein the longitudinal blocks is engaged when the vehicle speed falls below a preset threshold value v_1 and the transmission output torque exceeds a preset threshold value T_Ab1, and the engaged longitudinal block is disengaged when the vehicle speed exceeds another preset threshold value v_2 or the transmission output torque falls below another threshold value T_Ab2, the threshold value v_2 is higher than the threshold value v_1 and the threshold value T_Ab2 is lower than the threshold value T_A1.

3. The method according to claim 2, further comprising the step of permitting adjustment of the threshold value T_Ab1 by a driver of the four-wheel drive vehicle.

4. The method according to claim 3, further comprising the step of changing the threshold value T_Ab2 as a result of a change of the value of the threshold T_Ab1 which occurs via an algorithm or a characteristic line stored In a control.

5. The method according to claim 3, further comprising the step of using a potentiometer to adjust the threshold value T_Ab1, and the following functionalities being implemented according to a plotted curve of the potentiometer
   end stop 1: the longitudinal block is never engaged;
   end stop 2: the longitudinal block is manually engaged; and
   in an area between the end stop 1 and the end stop 2 continuous adjustment of the threshold value T_Ab1.

6. The method according to claim 2, wherein the vehicle is a dumper and the dumper has transverse blocks and the longitudinal block, and the method further comprising the step of manually engaging the transverse blocks.

* * * * *